(12) United States Patent
Bai et al.

(10) Patent No.: US 8,431,628 B2
(45) Date of Patent: Apr. 30, 2013

(54) ENVIRONMENTALLY DEGRADABLE COMPOSITE MATERIAL AND METHOD FOR PRODUCING THE SAME

(75) Inventors: Juan Bai, Wuhan (CN); Libin Zhang, Wuhan (CN)

(73) Assignee: Wuhan Huali Bio-Material Co., Ltd., Wuhan (CN)

( * ) Notice: Subject to any disclaimer, the term of this patent is extended or adjusted under 35 U.S.C. 154(b) by 0 days.

(21) Appl. No.: 12/839,431

(22) Filed: Jul. 20, 2010

(65) Prior Publication Data
US 2011/0028592 A1 Feb. 3, 2011

Related U.S. Application Data

(63) Continuation of application No. PCT/CN2010/070169, filed on Jan. 14, 2010.

(30) Foreign Application Priority Data

Mar. 31, 2009 (CN) .......................... 2009 1 0061362

(51) Int. Cl.
| | |
|---|---|
| C08K 5/00 | (2006.01) |
| C08K 5/01 | (2006.01) |
| C08K 5/05 | (2006.01) |
| C08K 5/09 | (2006.01) |
| C08K 3/26 | (2006.01) |
| C08L 3/00 | (2006.01) |

(52) U.S. Cl.
USPC ............. 523/124; 524/47; 524/210; 524/211; 524/291; 524/386; 524/389; 524/394; 524/425; 524/487; 528/289

(58) Field of Classification Search .................. 523/124; 524/47, 210, 211, 291, 386, 389, 394, 425, 524/487; 528/289
See application file for complete search history.

(56) References Cited

U.S. PATENT DOCUMENTS
6,096,809 A * 8/2000 Lorcks et al. .................... 524/47
6,111,058 A * 8/2000 Warzelhan et al. ........... 528/332

FOREIGN PATENT DOCUMENTS
EP 97937 A * 1/1984

* cited by examiner

*Primary Examiner* — Kriellion Sanders
(74) *Attorney, Agent, or Firm* — Matthias Scholl P.C.; Matthias Scholl

(57) ABSTRACT

An environmentally degradable composite having between 20 and 80 weight parts of a moderately cross-linked copolymer of aliphatic polyesteramide comprising random blocks, between 10 and 70 weight parts of a renewable raw material, between 5 and 20 weight parts of an additive, and between 0 and 30 weight parts of a filler. The composite has good mechanical properties, with a tensile strength of between 15 and 30 MPa, elongation at break of between 300 and 1000%, bending strength of between 10 and 25 MPa, and notched impact strength of between 20 and 90 $kJ/m^2$. The composite has good environmental degradability and after 12 weeks' composting, the biodegradation rate thereof exceeds 90%. The composite has good formation performance, and can be processed using conventional plastics processing equipment by extruding, injection molding, blow molding, and hot pressing for preparation of a variety of products.

5 Claims, No Drawings

ENVIRONMENTALLY DEGRADABLE COMPOSITE MATERIAL AND METHOD FOR PRODUCING THE SAME

CROSS-REFERENCE TO RELATED APPLICATIONS

This application is a continuation of International Patent Application No. PCT/CN2010/070169 with an international filing date of Jan. 14, 2010, designating the United States, now pending, and further claims priority benefits to Chinese Patent Application No. 200910061362.0 filed Mar. 31, 2009. The contents of all of the aforementioned applications, including any intervening amendments thereto, are incorporated herein by reference.

BACKGROUND OF THE INVENTION

1. Field of the Invention

The invention relates to an environmentally degradable polymer composite, and more particularly to an environmentally degradable composite produced by a renewable raw material and a moderately cross-linked aliphatic polyesteramide as well as a method for producing the same.

2. Description of the Related Art

Currently, the application of large amounts of high performance and cheap petrochemical plastics has seriously polluted the environment. Furthermore, global oil resources are depleted with passing day. Thus, to produce environmentally degradable products with renewable resources are an ideal choice to solve environmental and energy crisis.

Natural polymer materials, such as starch, cellulose (such as bamboo powder, straw power, bagasse), and lignin (such as wood flour), are rich in nature. They are cheap, renewable, and can be used for producing biodegradable materials. However, if the material is processed alone, the resultant degradable plastics have bad service performance. Newly-synthesized degradable plastics, such as aliphatic polyester, aliphatic-aromatic copolyester, and aliphatic polyesteramide, generally have good mechanical properties and service performance, but they are expensive. Thus, to produce an environmentally degradable composite with a cheap renewable raw material and high performance of polymers is a good means to solve the problem of properties and cost, and it has become an important research area of environmentally degradable materials.

Some literatures have disclosed the production of environmentally degradable composites with renewable raw materials and polymers. Mater-Bi, manufactured by Italian Novamont Co., Ltd., is made from starch and polycaprolactone (Catia B. Polymer Degradation and Stability, 1998, 59 (1-3): 263-272). The melting point of polycaprolactone is merely 60° C., which means the product can only be used at an environment with a temperature of 0-50° C. and a relative humidity of 30-80%. In low temperature, high temperature, and high humidity environments, the product is not practicable. Furthermore, Mater-Bi is very expensive, with a price exceeding 7,000 USD/ton. Among aliphatic polyester, polylactic acid has high melting point and excellent properties. Sun X Z (Kansas State University) et al mix natural starch with polylactic acid, but the compatibility thereof is bad, and the resultant product has unstable properties (Sun X Z. Applied Polymer Science, 2002, 84: 1257-1262).

Aliphatic polyesteramide is a copolymer of aliphatic-aromatic copolyester and aliphatic polyamide. It exhibits superior strength and mechanical properties in contrast to pure polyesters. Due to the coexistence of ester bond and amide bond, polyesteramide has amphiphilic properties. Thus, polyesteramide is more compatible with natural polymers than polyester. As long as the degree of polymerization of the polyamide block of the copolymer is less than 20, polyesteramide can be completely degraded in the environment. Although Chinese Patent Publication No. CN1242032A and CN1222171A disclose the composite of starch and polyesteramide, the properties thereof are not described in detail.

SUMMARY OF THE INVENTION

In view of the above-described problems, it is one objective of the invention to provide an environmentally degradable composite that has good mechanical properties, good degradability, and low cost. The composite is produced by a renewable raw material and a moderately cross-linked copolymer of aliphatic polyesteramide comprising random blocks.

It is another objective of the invention to provide a method for producing the composite. The method is effective, with high yield, and suitable for industrial production.

To achieve the above objectives, in accordance with one embodiment of the invention, there is provided an environmentally degradable composite comprising:

between 20 and 80 weight parts of a moderately cross-linked copolymer of aliphatic polyesteramide comprising random blocks, between 10 and 70 weight parts of a renewable raw material, between 5 and 20 weight parts of an additive, and between 0 and 30 weight parts of a filler.

In a class of this embodiment, the moderately cross-linked copolymer of aliphatic polyesteramide comprising random blocks is represented by the following formula:

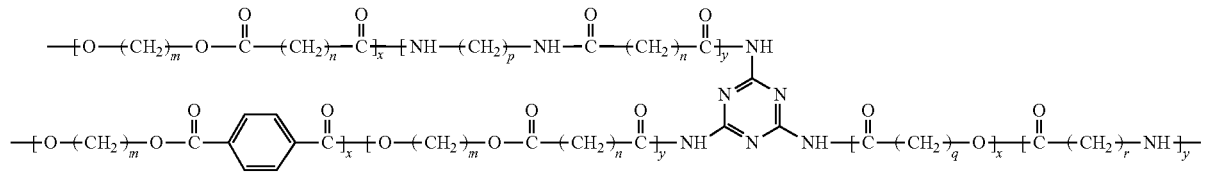

wherein m is an integer between 2 and 10; n is an integer between 2 and 12; p, q, and r are an integer between 2 and 12; m, n, and p are the same or different; x is an integer between 1 and 10; y is an integer between 1 and 10; and the molecular weight of the formula is between 40,000 and 150,000.

In a class of this embodiment, the moderately cross-linked copolymer of aliphatic polyesteramide comprising random blocks is represented by the following formula:

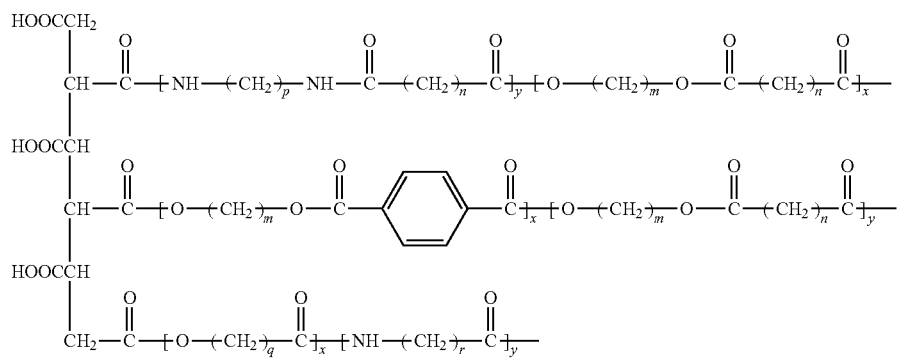

wherein m is an integer between 2 and 10; n is an integer between 2 and 12; p, q, and r are an integer between 2 and 12; m, n, and p are the same or different; x is an integer between 1 and 10; y is an integer between 1 and 10; and the molecular weight of the formula is between 40,000 and 150,000.

In a class of this embodiment, the moderately cross-linked copolymer of aliphatic polyesteramide comprising random blocks is represented by the following formula:

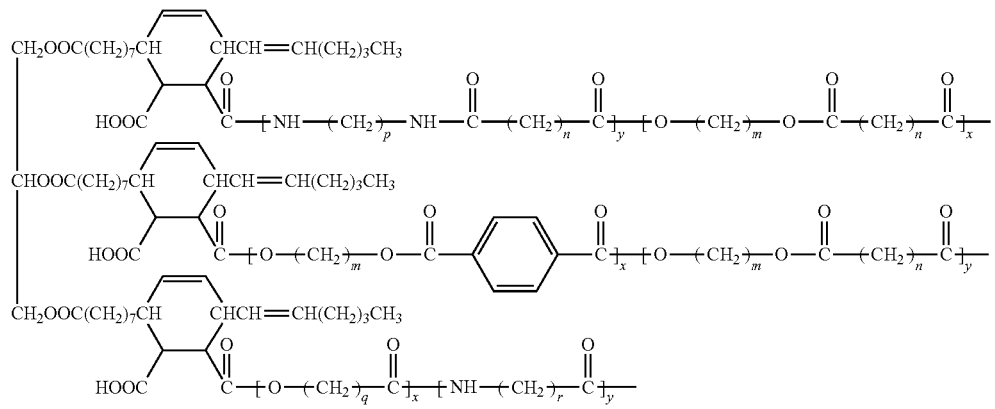

wherein m is an integer between 2 and 10; n is an integer between 2 and 12; p, q, and r are an integer between 2 and 12; m, n, and p are the same or different; x is an integer between 1 and 10; y is an integer between 1 and 10; and the molecular weight of the formula is between 40,000 and 150,000.

In a class of this embodiment, the renewable raw material is starch, cellulose (such as bamboo powder, straw power, bagasse), lignin (such as wood flour), chitin, chitosan, or a mixture thereof; the additive is a plasticizer, heat stabilizer, lubricant, antioxidant, or a mixture thereof; the filler is calcium carbonate, talc, wollastonite, silica, or a mixture thereof.

In a class of this embodiment, the plasticizer is glycerol, ethylene glycol, sorbitol, xylitol, maltitol, diethylene glycol, polyethylene glycol, fatty acid monoglyceride, urea, or a mixture thereof.

In a class of this embodiment, the heat stabilizer is calcium stearate, zinc stearate, barium stearate, dibutyltin dilaurate, dioctyltin dilaurate, Ca—Zn compound stabilizer, or a mixture thereof.

In a class of this embodiment, the lubricant is ethylene bis stearamide, polyethylene wax, oxidized polyethylene wax, polypropylene wax, liquid paraffin, or a mixture thereof; the antioxidant is ANTIOXIDANT 1010™ (pentaerythritol tetrakis(3-(3,5-di-tert-butyl-4-hydroxyphenyl)propionate)), ANTIOXIDANT 1076™ (octadecyl-3-(3,5-di-tert-butyl-4-hydroxyphenyl)propionate), ANTIOXIDANT 2246™ (2,2'-methylenebis(6-tert-butyl-4-methylphenol)), ANTIOXIDANT 245™ (triethylene glycol bis(3-(3-tert-butyl-4-hydroxy-5-methyphenyl)propionate)), or a mixture thereof.

In accordance with another embodiment, there is provided a method for producing an environmentally degradable composite, the method comprising the steps of:
  a) to a high speed mixer, adding between 20 and 80 weight parts of a moderately cross-linked copolymer of aliphatic polyesteramide comprising random blocks, between 10 and 70 weight parts of a renewable raw material, between 5 and 20 weight parts of an additive, and between 0 and 30 weight parts of a filler, stirring at a temperature between 50 and 150° C. for between 5 and 30 min, mixing uniformly, cooling, and collecting a mixture; and
  b) adding the mixture to a screw extruder and extruding at a temperature between 120 and 230° C. to yield a granule or sheet composite.

In the moderately cross-linked copolymer of aliphatic polyesteramide, the ester structural units form polyester and the amide ester structural units form polyamide. They are distributed in the form of random blocks. The randomly-distributed polyester and polyamide is copolymerized to yield the polyesteramide, which are cross-linked with a small amount of a tri-functional compound to yield a flowable polymer with moderate degree of branching. The cross-linking bond is an ester bond, amide bond, carbon-carbon bond, or a mixture thereof. The cross-linking degree of the polymer is controlled at between 5 and 0.1% so that the polymer has flowability for melting process. In the copolymer, the molar ratio of aromatic acids (or derivatives thereof) to the total carboxylic acids (derivatives thereof) doesn't exceed 40%.

In a class of this embodiment, the renewable raw material is starch, cellulose (such as bamboo powder, straw power, bagasse), lignin (such as wood flour), chitin, chitosan, or a mixture thereof.

In a class of this embodiment, the additive comprises (assuming the additive is 100 weight parts):
1) between 5 and 80 weight parts of a plasticizer, such as glycerol, ethylene glycol, sorbitol, xylitol, maltitol, diethylene glycol, polyethylene glycol, fatty acid monoglyceride, urea, or a mixture thereof;
2) between 5 and 50 weight parts of a heat stabilizer, such as calcium stearate, zinc stearate, barium stearate, dibutyltin dilaurate, dioctyltin dilaurate, Ca—Zn compound stabilizer, or a mixture thereof;
3) between 0 and 20 weight parts of a lubricant, such as ethylene bis stearamide (EBS), polyethylene wax, oxidized polyethylene wax, polypropylene wax, liquid paraffin, or a mixture thereof; and
4) between 1 and 20 weight parts of an antioxidant, such as ANTIOXIDANT 1010™ (pentaerythritol tetrakis(3-(3, 5-di-tert-butyl-4-hydroxyphenyl)propionate)), ANTIOXIDANT 1076™ (octadecyl-3-(3,5-di-tert-butyl-4-hydroxyphenyl)propionate), ANTIOXIDANT 2246™ (2,2'-methylenebis(6-tert-butyl-4-methylphenol)), ANTIOXIDANT 245™ (triethylene glycol-bis(3-(3-tert-butyl-4-hydroxy-5-methyphenyl)propionate)), or a mixture thereof.

Advantages of the invention are summarized below:
1) The composite is a white or light yellow solid and has good mechanical properties, with a tensile strength of between 15 and 30 MPa, elongation at break of between 300 and 1000%, bending strength of between 10 and 25 MPa, and notched impact strength of between 20 and 90 kJ/m$^2$; the composite has good service performance and the structure and properties thereof can be adjusted in a large range by controlling the weight percent of original components;
2) The composite has good environmental degradability and can be degraded under composting conditions; after 12 weeks' composting, the biodegradation rate of the composited exceeds 90%;
3) The composite has a melting point of between 120 and 180° C., and the melt flow rate is between 5 and 20 g/10 min, which means the composite has good formation performance, and can be processed using conventional plastics processing equipment by extruding, injection molding, blow molding, plastic sucking, and hot pressing for preparation of a variety of products; and
4) The method for producing the composite only comprises the steps of mixing and extruding, which is very simple, highly effective with high yield, and suitable for industrial production.

DETAILED DESCRIPTION OF THE EMBODIMENTS

For further illustrating the invention, experiments detailing an environmentally degradable polymer composite and a preparation method thereof are described below. It should be noted that the following examples are intended to describe and not to limit the invention.

Example 1

To a high-speed mixer at room temperature, 60 Kg of moderately-cross-linked polyesteramide, 20 Kg of cornstarch, 7 Kg of glycerin, 2 Kg of calcium stearate, 1 Kg of ethylene bis stearamide, 1 Kg of ANTIOXIDANT 1010™ (pentaerythritol tetrakis(3-(3,5-di-tert-butyl-4-hydroxyphenyl)propionate)), and 10 Kg of calcium carbonate are added. The mixture is stirred at a temperature between 50 and 150° C. for between 5 and 30 min, mixed uniformly, cooled, and collected. The mixture is further added to a screw extruder and extruded at a temperature between 120 and 230° C. to yield a composite. The composite has a tensile strength of 28 MPa, elongation at break of 1000%, bending strength of 25 MPa, and notched impact strength of 90 kJ/m$^2$.

Example 2

To a high-speed mixer at room temperature, 50 Kg of moderately-cross-linked polyesteramide, 30 Kg of cornstarch, 7 Kg of sorbitol, 2 Kg of calcium stearate, 1 Kg of ethylene bis stearamide, 1 Kg of ANTIOXIDANT 1010™ (pentaerythritol tetrakis(3-(3,5-di-tert-butyl-4-hydroxyphenyl)propionate)), and 10 Kg of calcium carbonate are added. The mixture is stirred at a temperature between 50 and 150° C. for between 5 and 30 min, mixed uniformly, cooled, and collected. The mixture is further added to a screw extruder and extruded at a temperature between 120 and 230° C. to yield a composite. The composite has a tensile strength of 22 MPa, elongation at break of 800%. bending strength of 19 MPa, and notched impact strength of 77 kJ/m$^2$.

Example 3

To a high-speed mixer at room temperature, 40 Kg of moderately-cross-linked polyesteramide, 40 Kg of cornstarch, 8 Kg of polyethylene glycol, 1 Kg of zinc stearate, 0.5 Kg of ethylene bis stearamide, 0.5 Kg of ANTIOXIDANT 1010™ (pentaerythritol tetrakis(3-(3,5-di-tert-butyl-4-hydroxyphenyl)propionate)), and 10 Kg of wollastonite are added. The mixture is stirred at a temperature between 50 and 150° C. for between 5 and 30 min, mixed uniformly, cooled, and collected. The mixture is further added to a screw extruder and extruded at a temperature between 120 and 230° C. to yield a composite. The composite has a tensile strength of 16 MPa, elongation at break of 600%, bending strength of 15 MPa, and notched impact strength of 40 kJ/m$^2$.

Example 4

To a high-speed mixer at room temperature, 60 Kg of moderately-cross-linked polyesteramide, 20 Kg of cellulose (bamboo powder), 8 Kg of fatty acid monoglyceride, 2 Kg of barium stearate, 1 Kg of oxidized polyethylene wax, 1 Kg of ANTIOXIDANT 2246™ (2,2'-methylenebis(6-tert-butyl-4-methylphenol)), and 8 Kg of wollastonite are added. The mixture is stirred at a temperature between 50 and 150° C. for between 5 and 30 min, mixed uniformly, cooled, and collected. The mixture is further added to a screw extruder and extruded at a temperature between 120 and 230° C. to yield a composite. The composite has a tensile strength of 20 MPa, elongation at break of 600%, bending strength of 18 MPa, and notched impact strength of 50 kJ/m².

Example 5

To a high-speed mixer at room temperature, 50 Kg of moderately-cross-linked polyesteramide, 30 Kg of cellulose (bamboo powder), 8 Kg of ethylene glycol, 2 Kg of dibutyltin dilaurate, 1 Kg of ethylene bis stearamide, 1 Kg of ANTI-OXIDANT 2246™ (2,2'-methylenebis(6-tert-butyl-4-methylphenol)), and 8 Kg of calcium carbonate are added. The mixture is stirred at a temperature between 50 and 150° C. for between 5 and 30 min, mixed uniformly, cooled, and collected. The mixture is further added to a screw extruder and extruded at a temperature between 120 and 230° C. to yield a composite. The composite has a tensile strength of 17 MPa, elongation at break of 400%, bending strength of 15 MPa, and notched impact strength of 46 kJ/m².

Example 6

To a high-speed mixer at room temperature, 60 Kg of moderately-cross-linked polyesteramide, 20 Kg of lignin (wood flour), 8 Kg of xylitol, 2 Kg of dioctyltin dilaurate, 1 Kg of polyethylene wax, 1 Kg of ANTIOXIDANT 1076™ (octadecyl-3-(3,5-di-tert-butyl-4-hydroxyphenyl)propionate), and 8 Kg of talc are added. The mixture is stirred at a temperature between 50 and 150° C. for between 5 and 30 min, mixed uniformly, cooled, and collected. The mixture is further added to a screw extruder and extruded at a temperature between 120 and 230° C. to yield a composite. The composite has a tensile strength of 18 MPa, elongation at break of 400%, bending strength of 19 MPa, and notched impact strength of 48 kJ/m².

Example 7

To a high-speed mixer at room temperature, 50 Kg of moderately-cross-linked polyesteramide, 30 Kg of lignin (wood flour), 8 Kg of diethylene glycol, 2 Kg of Ca—Zn compound stabilizer, 1 Kg of polyethylene wax, 1 Kg of ANTIOXIDANT 1076™ (octadecyl-3-(3,5-di-tert-butyl-4-hydroxyphenyl)propionate), and 8 Kg of talc are added. The mixture is stirred at a temperature between 50 and 150° C. for between 5 and 30 min, mixed uniformly, cooled, and collected. The mixture is further added to a screw extruder and extruded at a temperature between 120 and 230° C. to yield a composite. The composite has a tensile strength of 15 MPa, elongation at break of 300%, bending strength of 18 MPa, and notched impact strength of 40 kJ/m².

Example 8

To a high-speed mixer at room temperature, 60 Kg of moderately-cross-linked polyesteramide, 20 Kg of chitin, 8 Kg of maltitol, 2 Kg of Ca—Zn compound stabilizer, 1 Kg of polypropylene wax, 1 Kg of ANTIOXIDANT 245™ (triethylene glycol-bis(3-(3-tert-butyl-4-hydroxy-5-methyphenyl) propionate)), and 8 Kg of ultrafine silica are added. The mixture is stirred at a temperature between 50 and 150° C. for between 5 and 30 min, mixed uniformly, cooled, and collected. The mixture is further added to a screw extruder and extruded at a temperature between 120 and 230° C. to yield a composite. The composite has a tensile strength of 22 MPa, elongation at break of 600%, bending strength of 20 MPa, and notched impact strength of 48 kJ/m².

Example 9

To a high-speed mixer at room temperature, 50 Kg of moderately-cross-linked polyesteramide, 30 Kg of chitin, 8 Kg of urea, 2 Kg of Ca—Zn compound stabilizer, 1 Kg of polypropylene wax, 1 Kg of ANTIOXIDANT 245™ (triethylene glycol-bis(3-(3-tert-butyl-4-hydroxy-5-methyphenyl) propionate)), and 8 Kg of ultrafine silica are added. The mixture is stirred at a temperature between 50 and 150° C. for between 5 and 30 min, mixed uniformly, cooled, and collected. The mixture is further added to a screw extruder and extruded at a temperature between 120 and 230° C. to yield a composite. The composite has a tensile strength of 16 MPa, elongation at break of 350%, bending strength of 22 MPa, and notched impact strength of 50 kJ/m².

The invention claimed is:

1. An environmentally degradable composite, comprising:
    a) between 20 and 80 weight parts of a environmentally degradable cross-linked polyesteramide comprising random blocks, said environmentally degradable cross-linked polyesteramide being represented by the following formula:

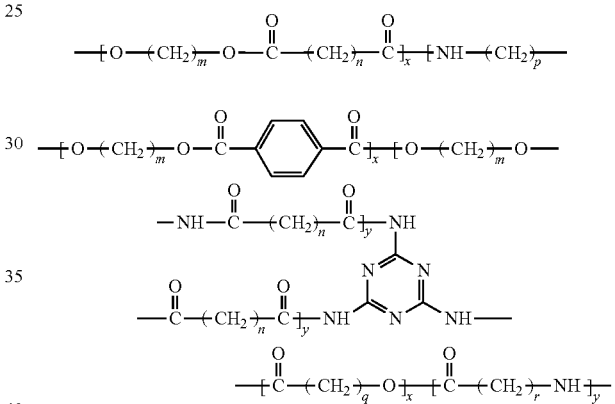

wherein m is an integer between 2 and 10; n is an integer between 2 and 12; p, q, and r are integers between 2 and 12; x is an integer between 1 and 10; y is an integer between 1 and 10; and said environmentally degradable cross-linked polyesteramide has a degree of cross-linking of from 0.1% to 5%;
    b) between 10 and 70 weight parts of a renewable raw material;
    c) between 5 and 20 weight parts of an additive, said additive being a mixture of a plasticizer, a heat stabilizer, a lubricant, and an antioxidant, wherein
        said plasticizer is glycerol, ethylene glycol, sorbitol, xylitol, maltitol, diethylene glycol, polyethylene glycol, fatty acid monoglyceride, urea, or a mixture thereof;
        said heat stabilizer is calcium stearate, zinc stearate, barium stearate, dibutyltin dilaurate, dioctyltin dilaurate, Ca—Zn compound stabilizer, or a mixture thereof;
        said lubricant is ethylene bis stearamide, polyethylene wax, oxidized polyethylene wax, polypropylene wax, liquid paraffin, or a mixture thereof; and
        said antioxidant is pentaerythritol tetrakis(3-(3,5-di-tert-butyl-4-hydroxyphenyl)propionate), octadecyl-3-(3,5-di-tert-butyl-4-hydroxyphenyl)propionate, 2,2'-methylenebis(6-tert-butyl-4-methylphenol), triethylene glycol-bis(3-(3-tert-butyl-4-hydroxy-5-methyphenyl)propionate), or a mixture thereof; and d) between 0 and 30 weight parts of a filler;

wherein:

the environmentally degradable composite has a tensile strength of between 15 and 30 MPa, an elongation at break of between 300 and 1000%, a bending strength of between 10 and 25 MPa, and a notched impact strength of between 20 and 90 kJ/m$^2$.

2. The environmentally degradable composite of claim 1, wherein said renewable raw material is starch, cellulose, lignin, chitin, chitosan, or a mixture thereof.

3. The environmentally degradable composite of claim 1, wherein said filler is calcium carbonate, talc, wollastonite, silica, or a mixture thereof.

4. A method for producing the environmentally degradable composite of claim 1, the method comprising the steps of:

a) to a high speed mixer, adding between 20 and 80 weight parts of said environmentally degradable cross-linked polyesteramide comprising random blocks, between 10 and 70 weight parts of said renewable raw material, between 5 and 20 weight parts of said additive, and between 0 and 30 weight parts of said filler, stirring at a temperature between 50 and 150° C. for between 5 and 30 min, mixing uniformly, cooling, and collecting a mixture; and b) adding said mixture to a screw extruder and extruding at a temperature between 120 and 230° C. to yield a granule or sheet composite.

5. The environmentally degradable composite of claim 1, wherein said renewable raw material is starch; said filler is calcium carbonate; and said additive is a mixture of a plasticizer being glycerol; a heat stabilizer being calcium stearate; a lubricant being ethylene bis stearamide; and an antioxidant being pentaerythritol tetrakis(3-(3,5-di-tert-butyl-4-hydroxyphenyl)propionate); and said composite has a tensile strength of 28 MPa, an elongation at break of 1000%, a bending strength of 25 MPa, and a notched impact strength of 90 kJ/m$^2$.

\* \* \* \* \*